Figure 1:
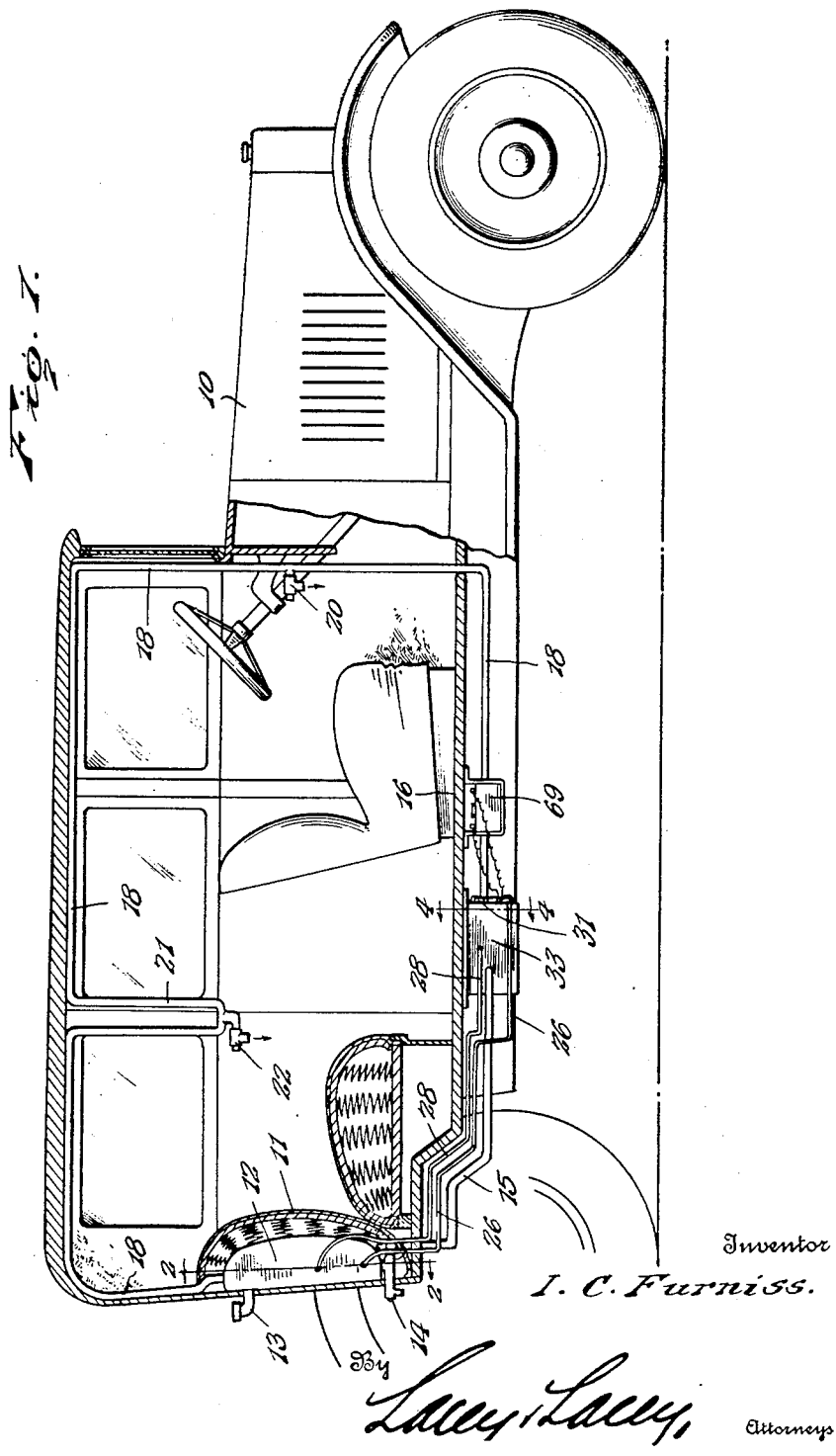

Sept. 12, 1933.  I. C. FURNISS  1,926,767
AUTO ICER
Filed Oct. 28, 1932  4 Sheets-Sheet 1

Inventor
I. C. Furniss.
By Lacey & Lacey,
Attorneys

Sept. 12, 1933.   I. C. FURNISS   1,926,767
AUTO ICER
Filed Oct. 28, 1932   4 Sheets-Sheet 2
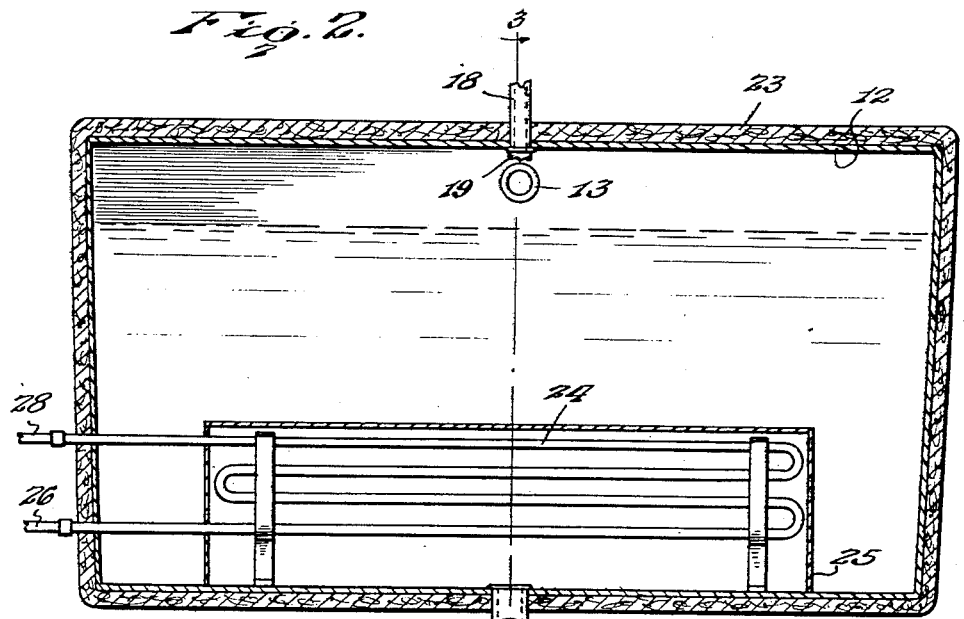
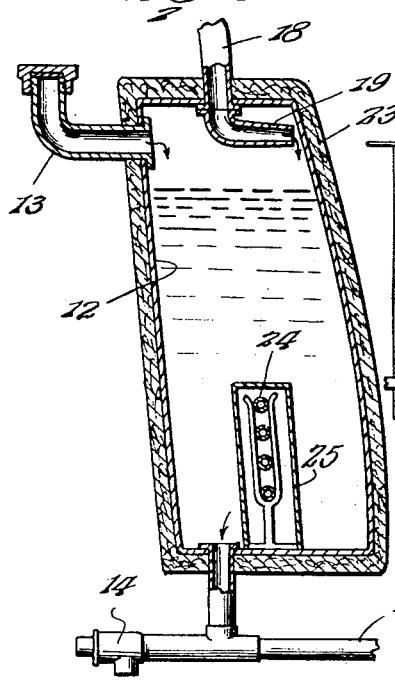
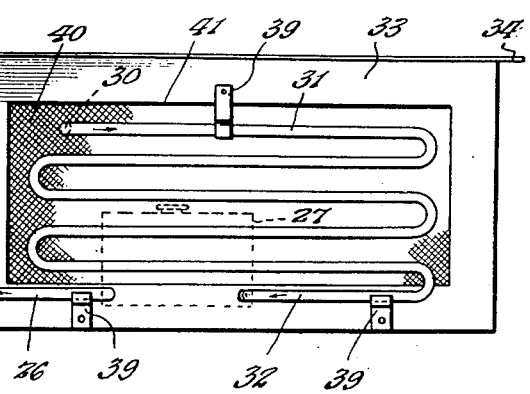
Inventor
I. C. Furniss.
By Lacey & Lacey, Attorneys

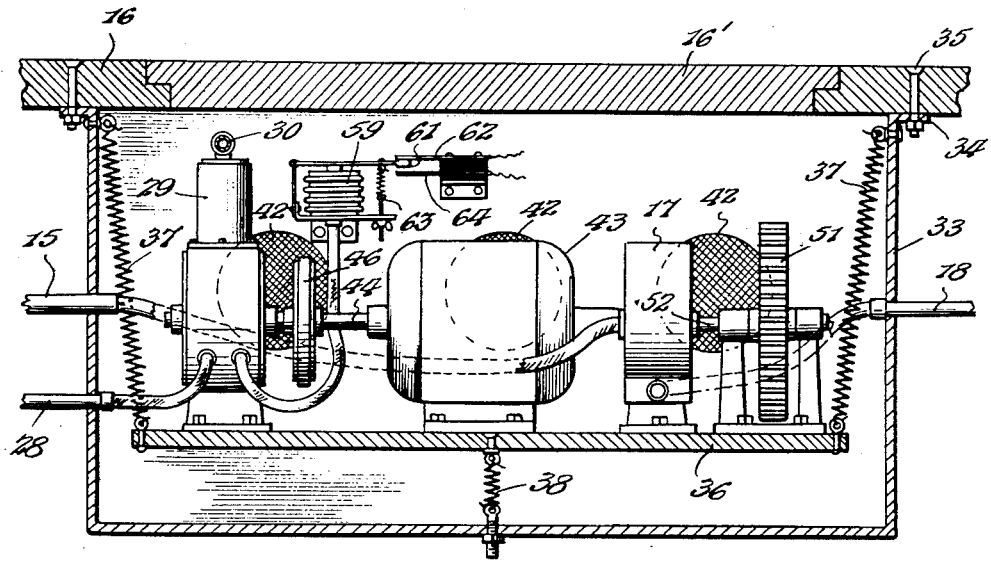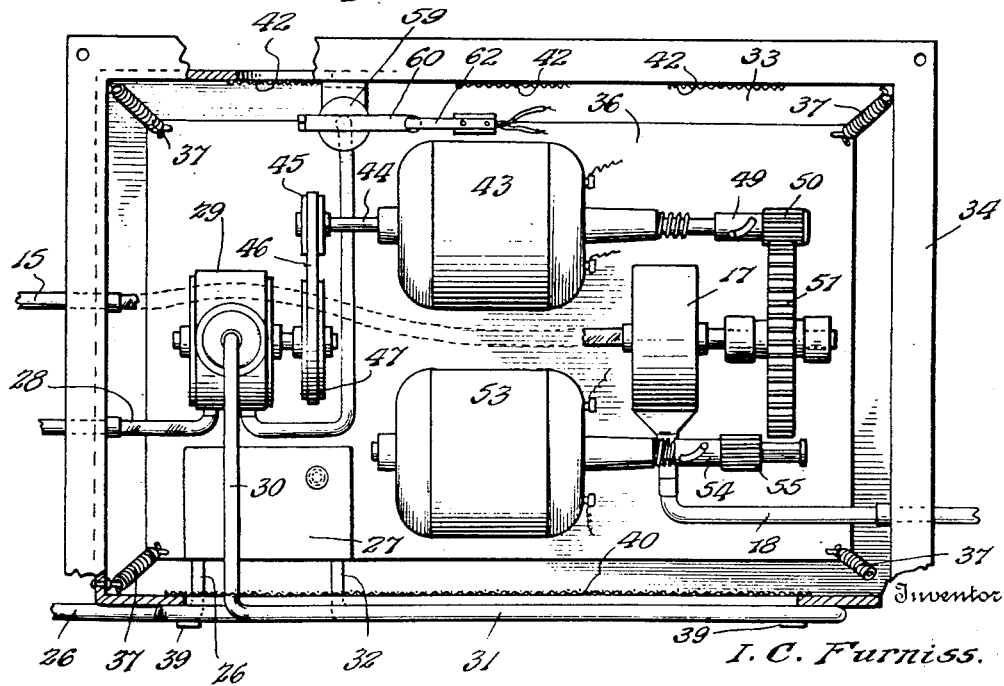

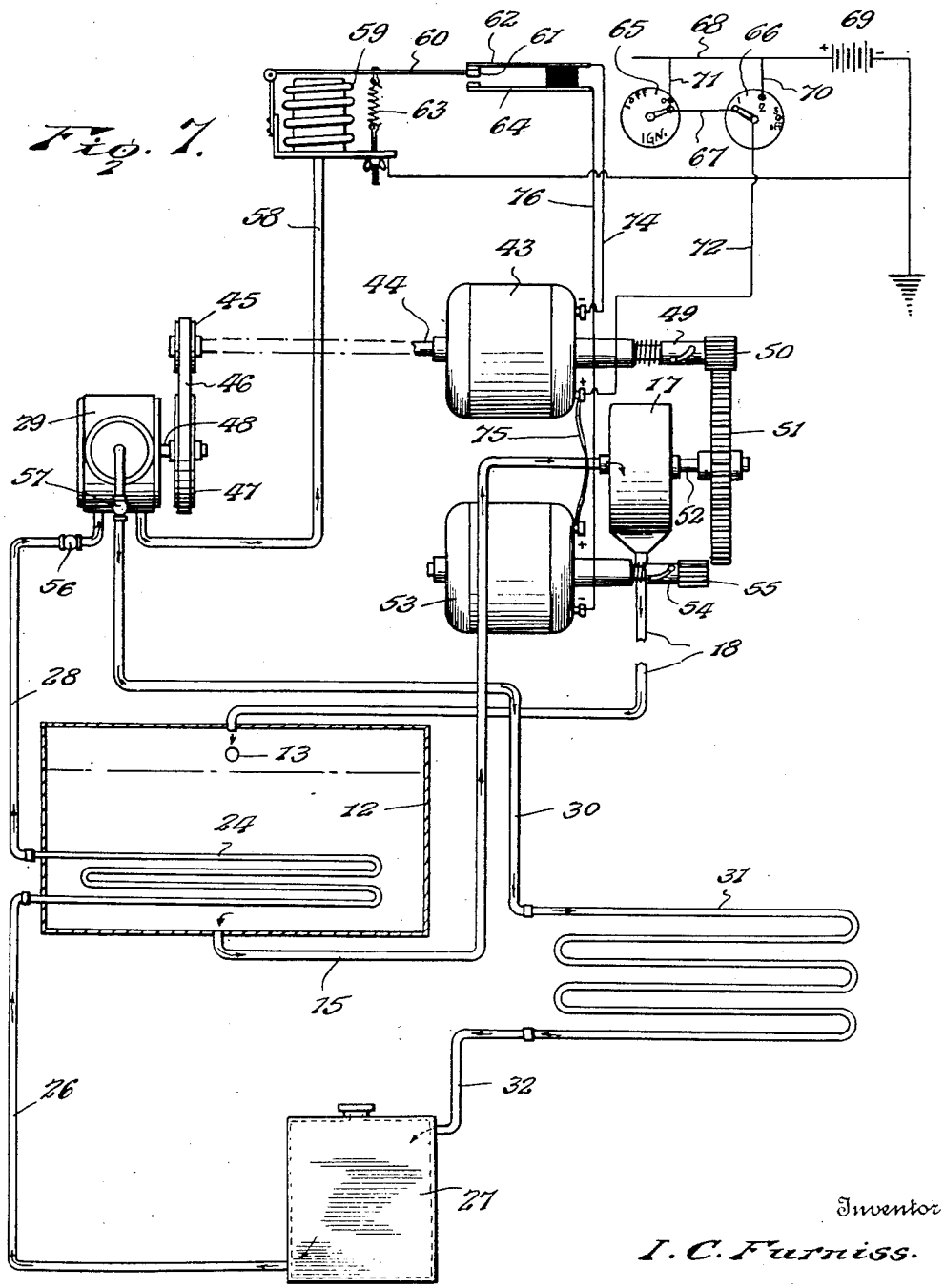

Patented Sept. 12, 1933

1,926,767

UNITED STATES PATENT OFFICE 1,926,767

AUTO ICER

Ira C. Furniss, Columbus, Ohio

Application October 28, 1932. Serial No. 640,093

7 Claims. (Cl. 62—117)

This invention relates to automotive appliances and has for a principle object to provide apparatus for supplying running ice water to automotive vehicles such as pleasure cars, buses and the like so that home water may be supplied to the passengers on long tours.

A further object is to provide a water tank and a system of piping and outlets which may be installed on new vehicles as well as used vehicles without extensive alterations.

A further object is to provide a simple, inexpensive and compact electric refrigerating plant for cooling the water, the current for running the motors being supplied by the usual 6-volt ignition system of the vehicle.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of a sedan, partly in section, and equipped with the apparatus comprising the invention, Figure 2 is a longitudinal section of the water tank, Figure 3 is a cross section of the water tank taken on the line 3—3 of Figure 2, Figure 4 is a cross section of the refrigerating apparatus taken on the line 4—4 of Figure 5, Figure 5 is a plan view of the refrigerating apparatus shown in Figure 4, Figure 6 is a front end elevation of the refrigerating apparatus housing and the cooling coil, and Figure 7 is a diagrammatic view of the various elements of the apparatus and the electric wiring thereof.

Referring now to the drawings in which like characters of reference designate similar parts in the various views, 10 designates an automobile which, in the present instance, by way of example is of the sedan type. Preferably the back 11 of the rear seat is formed with a compartment of sufficient size to receive a water tank 12. However, the tank may be placed under the floor boards, under a seat, or built in a side panel of an automobile, if desired. The tank is provided with a filling spout 13 and a drain spout 14, both of which are disposed within convenient reach on the exterior of the automobile. The tank may be of any desired capacity.

A pipe 15 leads from the bottom of the tank forwardly underneath the floor boards 16 and is connected with the inlet side of a rotary pump 17, best shown in Figure 7. A return pipe 18 is connected with the outlet side of the pump and passes forwardly underneath the floor boards thence upwardly to the roof of the car and thence rearwardly to the back of the car where it enters the top of the water tank. Preferably the pipe terminates in a lateral spout 19, best shown in Figure 3, which discharges the water against a wall of the tank so that the water will hit and run down inside of the tank without noise from dripping.

The pipe 18 is provided with a faucet 20 within convenient reach of the passengers in the front seat, and also the pipe 18 is provided with a downward branch 21 which is equipped with a faucet 22 that is disposed within convenient reach of the passengers in the back seat. These faucets may be of any desired type but preferably are of the push type. The pump operates to draw water from the tank through the pipe 15 and return it to the tank through the pipe 18 thus providing a circulation of water under sufficient pressure to operatably supply the faucets 20 and 22.

As best shown in Figure 3, the tank is provided with a cork or similar insulating housing 23 to retard conduction of low temperature through the metal wall of the tank. Within the tank there is disposed a coil 24 constituting a referigerating unit which is mounted on a suitable support in a housing 25 which is submerged in the water. A feed pipe 26, best shown in Figure 7, supplies the unit with sulphur dioxide or similar cooling medium from a suitable tank 27, hereinafter more fully described. An outlet pipe 28 conducts the vapor from the unit to a compressor 29, shown diagrammatically in Figure 7. From the compressor a pipe 30 conducts the liquid to a cooling coil 31 from whence it passes through a pipe 32 to replenish the $SO_2$ in the tank 27.

Preferably located underneath the floor boards 16, as best shown in Figures 4, 5 and 6, there is a housing 33 which is provided at the top with an external flange 34 through which bolts 35 may be passed to secure the housing to the underneath face of the floor boards. The housing is open at the top so that upon removal of a portion 16' of one of the floor boards access to the interior of the housing may be had. A floating base board 36 is mounted within the housing by means of suspension springs 37 and a tension spring 38, the former being secured to the corners of the board and to the housing near the top, while the latter is secured to the center of the board and to the bottom of the housing, as shown. Thus the base board is resiliently mounted to withstand vibration and shocks.

The above mentioned sulphur dioxide tank 27 is mounted on the board 36 and is of sufficient strength to stand the pressure of gas created, and will have sufficient capacity to contain four to six pounds, more or less, of $SO_2$. The above mentioned cooling coil 31 is preferably mounted on the front wall of the housing 33, as best shown in Figure 6, suitable clips 39 or other connectors being provided to secure the coil to the exterior of the housing. Preferably a screen 40 closes an opening 41 in said front wall back of the coil to provide for a current of air passing through the coil in the direction of motion of the vehicle. To further promote this current of air the back wall of the housing is provided with a plurality of screened openings 42 which are shown best in Figure 4.

For driving the rotary water pump 17 and the $SO_2$ compressor 29 a 6-volt electric motor 43 is provided with a shaft 44 which projects from both ends of the motor, one end of the shaft being preferably equipped with a pulley 45 which is belted, as shown at 46, to a pulley 47 fixed to the compressor shaft 48. The opposite end of the motor shaft is equipped with a clutch 49 of "Bendix" type which terminates in a gear 50 that meshes with a gear 51 fixed to the pump shaft 52. As shown in Figure 4, the compressor 29, motor 43, pump 17, and shaft 52 of the pump are provided with suitable mountings which may be bolted to the base board, as shown.

A second small 6-volt electric motor 53 is mounted on the board on the opposite side of the rotary pump from the motor 43. The motor 53 is provided on its shaft with a clutch 54 of the "Bendix" type which terminates in a gear 55 that meshes with the pump drive gear 51 diametrically opposite the gear 50, as best shown in Figures 3 and 5. The purpose of two motors with "Bendix" clutches is as follows. The motor 43 only runs intermittently to operate the compressor. When running it actuates the pump. When it stops its "Bendix" clutch disengages from the pump gear 51. Thereupon, the other motor 53 is automatically started, as will be presently explained, and its "Bendix" clutch engages the pump gear and drives the pump. Thus the pump is economically operated continuously to maintain circulation and water pressure in the pipe 18.

The compressor 29 is preferably of the single cylinder two cycle type and as usual the $SO_2$ inlet and outlet pipes 28 and 30 are equipped with check valves 56 and 57, best shown in Figure 7, which prevent retrograde movement of the $SO_2$. Furthermore, as usual, the pressure in the crank case of the compressor is utilized to start and stop the electric motor 43 and to this end a pipe 58 leads from the crank case to a siphon tube 59 of the usual type to be found in an electric refrigerating apparatus.

High pressure, due to expansion of the gas in the unit 24 in the water tank, expands the tube to move a pivoted grounded switch 60 and engage its contact 61 with a stationary switch contact 62 to start the motor 43 which operates the compressor 29. When the normal pressure is restored the tube 59 contracts and permits a tension spring 63 to swing the switch 60 and remove the contact 61 from the contact 62 to stop the motor.

Disposed opposite the stationary contact 62 in the path of movement of the pivoted switch contact 61 is a stationary switch contact 64. Contraction of the siphon tube permits the spring 63 to carry the contact 61 into engagement with the stationary switch contact 64 to start the motor 53 simultaneously with the stopping of the motor 43, as will now be described.

In addition to the usual ignition switch 65 mounted on the instrument board of the automobile I provide an auxiliary switch 66 having three terminals numbered 1, 2 and 3 respectively, the number 3 terminal being an off or dead terminal. A conductor wire 67 connects the #1 terminal of the auxiliary switch 66 with the on terminal of the ignition switch. A conductor wire 68 from the positive side of the storage battery 69 is provided with branch conductor wires 70 and 71 which lead respectively to the #2 terminal of the auxiliary switch 66 and to the on terminal of the ignition switch 65. A conductor wire 72 leads from the switch arm of the auxiliary switch to the plus terminal of the motor 43. A conductor wire 74 leads from the negative terminal of the motor to the stationary switch contact 62, above mentioned. When the siphon tube operated switch contact 61 is in contact with the stationary switch contact 62 a circuit may be traced from the battery through the wire 68, wire 71, wire 67, wire 72 to the motor 43 and from the motor through the wire 74 to the switch contact.

When the siphon tube operated switch contact 61 is in contact with the stationary switch contact 64, a circuit may be traced from the battery through the wire 68, wire 71, wire 67, wire 72 and through a conductor wire 75 which connects the plus terminals of both motors together, to the motor 53, and from the motor 53 through a conductor wire 76 to the stationary switch contact 64 and pivoted contact 61 to the ground. In this position of the contact 61 the motor 53 is operated.

It will be noted that, as above mentioned, a conductor wire 70 connects the ignition wire 68 from the battery with the #2 terminal of the auxiliary switch 66. The purpose of this is to permit of the operation of the compressor and the pump when the ignition is turned off, that is when the automobile is not in motion. It will be apparent when the switch arm of the ignition switch is turned to off position that the supply of current to the motors through the conductor wire 67 will be cut off. The switch arm of the auxiliary switch 66 is swung to engage the #2 switch contact of the auxiliary switch to restore the supply of current to the motors through the wire 70, #2 contact and switch arm, as will be obvious. Should it be desired to discontinue the use of the refrigerating apparatus for cooling the water, as for instance when the car is put up for the night, or even when the car is in motion, it simply will be necessary to swing the switch arm of the auxiliary switch on to the off contact #3 of the auxiliary switch.

From the above description it will be apparent that I have provided an extremely compact and inexpensive water cooling system for automotive vehicles and that the apparatus may be installed upon new cars as well as upon used cars without extensive alterations.

What is claimed is:

1. The combination with a motor vehicle body and the ignition devices thereof, of a drinking water tank carried by the body, water pipes connected to the tank and located within the body, an outlet inside the body, electric refrigerating apparatus operated by said ignition devices for cooling the water in the tank, a water pump connected to said pipes, and a motor driven by said ignition devices and driving the pump.

2. The combination with a motor vehicle body and the ignition devices thereof, of a drinking water tank carried by the body, a pipe line trained inside the body and terminally connected to the tank, a water pump in the pipe line for circulating water therethrough, a plurality of faucets connected to the pipe line and disposed within the body, an electric motor driven by said ignition devices and driving the pump, and electric refrigerating apparatus operated by said ignition devices for cooling the water in the tank.

3. The combination with a motor vehicle body and the ignition devices thereof, of a drinking water tank concealed behind the rear seat of the body, filling and drain pipes connected to said tank and disposed outside the body, a pipe line terminally connected to the top and to the bottom of said tank and trained around the inside of the body, faucets in the pipe line disposed within convenient reach of the seats of the body, a portion of said pipe line extending underneath the floor boards of the body, a housing carried underneath said floor boards, a pump in the housing connected to the last named portion of said pipe line for circulating water through the pipe line and tank, electric refrigerating apparatus operated by said ignition devices and disposed within said housing, a cooling unit in said tank operatively connected to said apparatus, and a motor operated by said ignition devices and driving said pump.

4. A water cooling apparatus for motor vehicles including a water tank, a pump, water pipes operatively connecting the pump with the tank, a refrigerant coil in the tank, a refrigerant supply tank, a compressor, refrigerant pipes connecting the compressor the supply tank and the coil, an electric motor for driving the pump, an electric motor for driving the compressor, a source of electric current connected in circuit with both motors, and switches for selectively controlling the supply of current to said motors.

5. A water cooling apparatus for motor vehicles including a water tank, a pump, water pipes operatively connecting the pump with the tank and having an outlet, a refrigerant coil in the tank, a refrigerant supply tank, a compressor, refrigerant pipes connecting the compressor the supply tank and the coil, a pair of electric motors for driving the pump, clutches operatively connecting the motors to the pump, driving means connecting one of said motors with said compressor, a source of electric current connected in circuit with both motors, and a refrigerant pressure controlled switch adapted to close the circuit of one motor and open the circuit of the other motor whereby the motors are alternately actuated to drive the water pump continuously to maintain circulation and pressure in said water pipes.

6. A water cooling apparatus for motor vehicles including a water tank, a pump, water pipes operatively connecting the pump with the tank, a faucet carried by one of the pipes, refrigerant apparatus for cooling the water in the tank, an electric motor for actuating said apparatus, a clutch operatively connecting said motor to said pump, a second electric motor, a clutch operatively connecting the last named motor to said pump, a source of electric current connected in circuit with both motors, and a switch automatically controlled by gas pressure in said refrigerant apparatus and controlling the supply of electric current to alternately close the circuit of one motor and open the circuit of the other motor.

7. In a water cooling apparatus, a water tank, a rotary pump, water pipes operatively connecting the pump with the tank, a refrigerant coil in the tank, a refrigerant supply tank, a compressor, refrigerant pipes connecting the compressor the supply tank and the coil, a pair of electric motors for driving the pump, "Bendix" clutches operatively connecting the motors to the pump, means operatively connecting one of said motors with said compressor, a source of electric current connected in circuit with both motors, a pressure responsive coil connected with said compressor, a spring controlled pivoted switch contact operated by said coil, and stationary switch contacts alternately engaged by said pivoted switch contact and disposed in the motor circuits for closing the circuit of one motor and opening the circuit of the other motor whereby the motors are alternately actuated to drive the rotary pump continuously.

IRA C. FURNISS.